May 22, 1956        C. B. SPASE        2,746,587
DRIVE STRUCTURE FOR AUTOMOBILE ENGINE ACCESSORIES
Filed Dec. 9, 1952
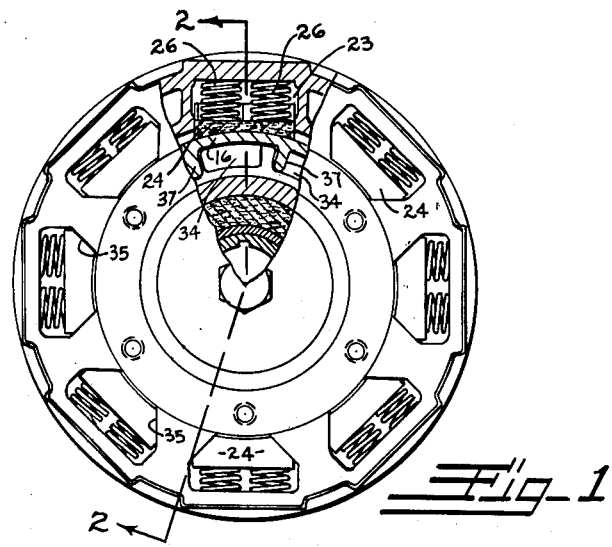
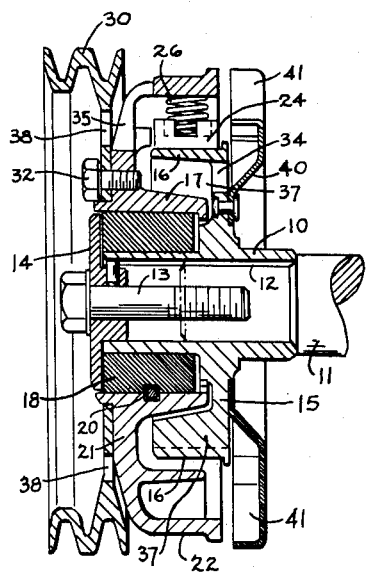
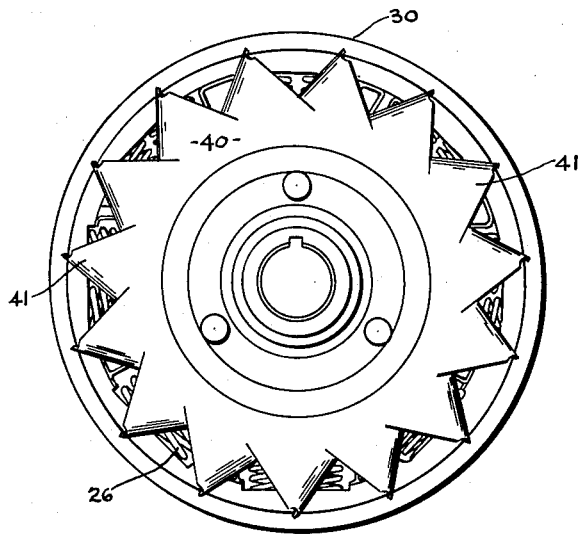
INVENTOR.
CHARLES B. SPASE
BY D. Emmett Thompson
Attorney

United States Patent Office 2,746,587
Patented May 22, 1956

2,746,587
DRIVE STRUCTURE FOR AUTOMOBILE ENGINE ACCESSORIES

Charles B. Spase, Nedrow, N. Y., assignor to Lipe-Rollway Corporation, Syracuse, N. Y., a corporation of New York Application December 9, 1952, Serial No. 324,866

3 Claims. (Cl. 192—104)

This invention relates to a drive structure for automobile engine accessories, such as the generator, power steering, air conditioning compressor, etc., and is of the general type disclosed in my copending application, Sr. No. 287,943, filed May 15, 1952.

This invention has as an object a drive structure of the type referred to embodying a compact structural arrangement which functions to rapidly dissipate heat generated in the device under certain conditions whereby the structural parts may be made more compact and of lighter weight.

This invention consists in the novel features and in the combinations and constructions hereinafter set forth and claimed.

In describing this invention, reference is had to the accompanying drawings in which like characters designate corresponding parts in all the views.

In the drawings:

Figure 1 is a front elevational view of a drive structure embodying my invention with the belt pulley removed and parts broken away, and parts shown in section.

Figure 2 is a sectional view of the device taken on a line corresponding to line 2—2, Figure 1.

Figure 3 is a rear elevational view looking to the left, Figure 2.

The drive structure consists of a drive member having a hub portion 10 fixedly mounted upon the crank shaft 11 of the automobile engine by way of a key 12 to effect rotation of the driving member with the shaft. The hub 10 is detachably secured to the shaft against axial displacement by a screw 13 and a washer 14. The driving member is formed with a radially extending flange 15 located intermediate the ends of the hub portion 10 and being provided or formed at its periphery with an annular drum portion 16.

A driven member is mounted for free rotation relative to the driving member and, in the illustrated embodiment of the invention, the driven member is formed with a hub portion 17 having a bearing 18 rotatably mounted upon the forward portion of the hub 10 of the driving member. The bearing 18 is interlocked with the hub 17 by a snap ring 20 and the end face of the bearing is engaged by the washer 14. The driven member is also formed with a radial flange 21, the periphery of which is provided or formed with an annular or cylindrical portion 22 formed with a plurality of circumferentially spaced apart pockets 23 extending radially inwardly. The annular portion 22 is arranged concentrically with and spaced outwardly from the drum 16. In each of the pockets 23, there is mounted for sliding radial movement a friction shoe 24 formed on its inner side with an arcuate face complemental to the drum 16 and against which it is urged by compression springs 26 mounted in the pockets 23 intermediate the bottom wall of the pockets and the shoes 24.

As more particularly explained in my copending application, the area of frictional contact between the shoes and the drum and the pressure exerted by the springs 26 is such as to effectively transmit a predetermined maximum torque from the drum to the shoes and thus the driven member up to a predetermined R. P. M. of the driven member. When the driven member is rotated at a speed above the predetermined R. P. M., the frictional engagement between the shoes and the drum is reduced by centrifugal force to maintain the driven member at or in the neighborhood of the predetermined speed and under varying torque requirements by the accessories being driven. The accessories are driven by belts trained over a pulley 30 affixed to the radial flange 21 of the driven member, as by screws 32.

The radial flange 15 of the driving member is formed with a series of circumferentially spaced apart apertures 34 located between the hub 10 and the drum 16. The radial flange 21 of the driven member is also formed with a series of irregular shaped apertures 35, these apertures being spaced apart circumferentially and being spaced radially from the axis of the structure so as to be in alinement with the space between the drum 16 and the annular portion 22 and therefor in alinement with the pockets 23 in which the friction shoes and springs 26 are mounted.

The driving member is also formed with a series of heat conducting ribs 37 extending radially inwardly from the drum 16, the ribs being positioned intermediate the apertures 34. The radial portion of the pulley 30 is also formed with apertures 38 arranged radially in alignment with the apertures 35.

A fan member 40 is mounted upon the driving member and extends radially of the rear end of the drum 16, the fan being provided with blades 41 and is of the centrifugal type. The fan functions to draw air inwardly through the apertures 34, 35, 38 and discharging the air radially of the structure. This effects a substantial movement of air over the friction shoes 24 and spring 26, and between the heat conducting ribs 37.

In the event the automobile is being operated at high speed and simultaneously there is applied to the drive structure a substantial torque load by the accessories being driven, there will be considerable slippage between the friction shoes and the drum, this slippage developing a considerable amount of heat—especially in the drum 16. With the structural arrangement described, this heat is readily dissipated thereby minimizing wear between the shoes and the drum, whereby the drive structure functions over long periods of time without the necessity of servicing.

What I claim is:

1. A drive structure for automobile engine accessories comprising a driving member fixedly mounted on the engine crank shaft and having a radial flange provided at its periphery with an annular friction drum portion, a driven member journalled for rotation relative to the driving member and having a flange extending radially at one end of said annular friction drum and having an annular portion encircling said drum and being concentrically spaced outwardly therefrom, a series of friction shoes interposed between said friction drum and said annular portion of the driven member, said shoes being carried by said annular portion for radial movement toward and from the drum, spring means interposed between said annular portion and each of said friction shoes to move the same into frictional engagement with the periphery of the drum, the radial flange of said driven member being formed with a series of circumferentially spaced apart apertures, said apertures and said friction shoes being located an equal radial distance from the axis of rotation, and a centrifugal type fan carried by said driving member and extending radially at the opposite end of the friction drum, and having its blade portions arranged to create an air flow through said apertures and over said shoes and springs.

2. A drive structure for automobile engine accessories comprising a driving member fixedly mounted on the engine crank shaft and having a radial flange provided at its periphery with an annular friction drum portion, a driven member journalled for free rotation relative to the driving member and having a flange extending radially at one end of said annular friction drum and having an annular portion encircling said drum and being concentrically spaced outwardly therefrom, a series of friction shoes interposed between said friction drum and said annular portion of the driven member, said shoes being carried by said annular portion for radial movement toward and from the drum, spring means interposed between said annular portion and each of said friction shoes to move the same into frictional engagement with the periphery of the drum, the radial flange of said driven member being formed with a series of circumferentially spaced apart apertures positioned radially from the axis of the structure so as to be in axial alinement with the radial spacing between said friction drum and the annular portion of the driven member, a centrifugal fan carried by said driven member at the opposite end of the friction drum and having its blade portions arranged to create an air flow through said apertures and over said shoes and springs.

3. A drive structure for automobile engine accessories comprising a driving member having a hub portion fixedly mounted on the crank shaft of the engine and having a radial flange carrying an annular friction drum, a driven member journalled for free rotation on the hub portion of the driving member and having a radial flange, arranged in confronting relation to one end of said drum, formed at its periphery with an annular flange encircling said friction drum and being spaced concentrically outwardly therefrom, a series of friction shoes interposed between said friction drum and said annular flange of the driven member, said shoes being carried by said annular flange for radial movement toward and from the drum, a spring means interposed between said annular flange and each of said friction shoes to move the same into frictional engagement with the periphery of the drum, the radial flange of said driven member being formed adjacent its periphery with a series of circumferentially spaced apart apertures, said apertures, friction shoes and springs being located an equal radial distance from the axis of rotation, and the radial flange of said drive member being formed with a circular series of apertures arranged intermediate the hub portion thereof and said drum, a centrifugal type fan carried by said driving member and having a central disk portion extending radially and in outwardly spaced relation to the opposite end of the friction drum, and having its blade portions arranged to creat an air flow through said apertures.

References Cited in the file of this patent

UNITED STATES PATENTS

| 1,434,770 | Bryson | Nov. 7, 1922 |
| 1,599,373 | Roberts | Sept. 7, 1926 |
| 1,955,304 | Libby | Apr. 17, 1934 |

FOREIGN PATENTS

| 283,723 | Great Britain | Jan. 19, 1928 |